A. D. Puffer,
Soda Water Cooler,
Nº 39,587.    Patented Aug. 18, 1863.
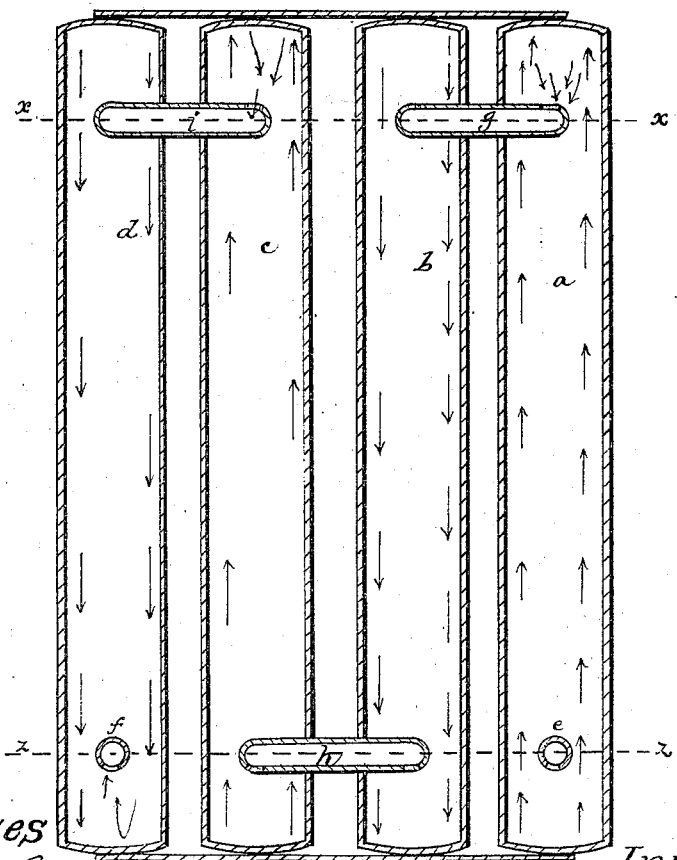
Witnesses
J. B. Crosby
Francis Gould
Inventor
A. D. Puffer

UNITED STATES PATENT OFFICE.

A. D. PUFFER, OF SOMERVILLE, MASSACHUSETTS.

IMPROVED SODA-WATER COOLER.

Specification forming part of Letters Patent No. 39,587, dated August 18, 1863.

*To all whom it may concern:*

Be it know that I, A. D. PUFFER, of Somerville, county of Middlesex, and State of Massachusetts, have invented an Improved Soda-Cooler; and I do hereby declare that the following, taken in connection with the drawings which accompany and form part of this specification, is a description of my invention sufficient to enable those skilled in the art to practice it.

This invention consists in a new or peculiar manner of conducting soda-water through a cooler or refrigerating apparatus, the purpose of the invention being to thoroughly and effectually carry or force the water, in its passage through a series of cooling-cylinders, against the refrigerated sides or inner surfaces of such cylinders, or to prevent the formation of a central or inner current through the body of water in such cylinders.

Figure 1 of the accompanying drawings represents a horizontal section of the cooling apparatus; Fig. 2, a cross-section taken on the line $x\,x$ of Fig. 1, and looking toward the adjacent end of the cooler; Fig. 3, a cross-section on the line $z\,z$ of Fig. 1, looking toward the end of the cooler adjacent to that line.

In the drawings, $a\,b\,c\,d$ denote a series of four or any other suitable number of metallic cylinders or coolers, which are to be packed in ice or otherwise properly refrigerated. Near one end of the cylinder $a$ an induction pipe, $e$, enters, and from near one end of the farther cylinder, $d$, therefrom an eduction or outlet pipe, $f$, extends, while cross-pipes $g\,h\,i$ connect the cylinders together, as seen in Fig. 1. The water entering through the pipe $e$ from the soda fountain courses through the cylinder $a$, thence by pipe $g$ into cylinder $b$, thence through said cylinder into and through pipe $h$ into cylinder $c$, thence through cylinder $c$ and pipe $i$ into cylinder $d$, and thence through said cylinder into and out of eduction-pipe $f$, which leads to the cock or faucet where the soda-water is to be drawn. The object in passing the water through the succession of coolers in this manner is to bring it in its passage into contact with a very large extent of cold surface, so that when drawn as a beverage it shall have the coldest possible temperature. Now, if the orifice in the lower part of the pipe $e$ opens toward the main body of the cooler $a$, through which the water is to flow, and the water is received into pipe $g$ through an orifice opposite to said orifice in pipe $e$, and so on through all the cylinders, the inlet and outlet orifices in the pipes opening into and toward the main body of water in each of the cylinders, the tendency would be to make a small current of water in each cylinder passing directly through the main body of water in a straight current from orifice to orifice, keeping at or near the temperature of the water in the fountain, and leaving the fluid which lies between this current and the cooled surfaces of the cylinders quiescent or very sluggish in its movement, the two bodies intermingling but to a slight degree, and the current from the fountain being cooled only to such an extent as would be imparted by contact with the cooler body of water surrounding it, and partial coalescence therewith. It is therefore a desideratum to move or agitate the whole body of water, avoiding any independent currents, so that the currents of water shall thoroughly commingle and be thrown against the cool surface of the cylinders in their passage through them, refrigerating the whole body. This I accomplish as follows: The orifice in the lower end of the pipe $e$ is made in the rear of said pipe, or toward the adjacent end of the cylinder, and the orifices at the opposite ends of the cross-pipe $g$ open toward the adjacent ends of the cylinders $a\,b$, and so with the orifices in the connecting-pipes $h\,i$ and outlet-pipe $f$, each orifice opening opposite to the main current of water, or so as to discharge and receive the water against its main direction. Thus, as the water leaves the pipe $e$, it flows toward and impinges against the adjacent end of the cylinder $a$ then being reversed, and flowing against the surface of the cylinder to its opposite end, against which it impinges, and is again reversed, passing into the pipe $g$. From this pipe it flows in a similar manner through its orifice against the adjacent end of cylinder $b$, thence reversing and flowing down against the sides of the cylinder and into pipe $h$, and so on in the same manner through cylinder $c$, pipe $i$, cylinder $d$, and outlet $f$, the arrows in Fig. 1 serving to illustrate the course of the water. In this way any tendency to form independent currents or quiescent bodies of water in any cylinder is prevented, the number of currents keeping the whole body agitated and flowing and passing in contact with the cooling-surfaces, as will be readily understood.

I claim—

So constructing the inlet and outlet pipes of a series or system of cooling-cylinders, and the pipes connecting said cylinders, that the orifices in said pipes shall be adjacent to the nearest ends of said cylinders, substantially as and for the purpose set forth.

A. D. PUFFER.

Witnesses:
J. B. CROSBY,
FRANCIS GOULD.